(12) United States Patent
Kim et al.

(10) Patent No.: US 8,420,046 B1
(45) Date of Patent: Apr. 16, 2013

(54) METHOD OF PREPARING HIGH CRYSTALLINE NANOPOROUS TITANIUM DIOXIDE PHOTOCATALYST

(75) Inventors: Hae-Jin Kim, Daejeon (KR); Jou-Hahn Lee, Daejeon (KR); Soon-Chang Lee, Daejeon (KR); Hyun-Uk Lee, Chungcheongbuk-do (KR); Won-Ki Hong, Daejeon (KR); Hye-Ran Kim, Daejeon (KR); Jung-Hye Seo, Chungcheongnam-do (KR)

(73) Assignee: Korea Basic Science Institute, Yuseong-gu (KR)

( * ) Notice: Subject to any disclaimer, the term of this patent is extended or adjusted under 35 U.S.C. 154(b) by 0 days.

(21) Appl. No.: 13/409,029

(22) Filed: Feb. 29, 2012

(51) Int. Cl.
*C01G 23/047* (2006.01)

(52) U.S. Cl.
USPC .......................................... 423/610; 423/611

(58) Field of Classification Search .................. 423/610, 423/611
See application file for complete search history.

(56) References Cited

U.S. PATENT DOCUMENTS

2005/0013766 A1* 1/2005 Imura et al. .................. 423/610

FOREIGN PATENT DOCUMENTS

KR 10-2011-0011973 2/2011

OTHER PUBLICATIONS

Kim, et al., "Synthesis and photocatalytic activity of mesoporous TiO2 with the surface area, crystallite size and pore size" 2007, J. of Colloid and Interface Science 316, pp. 85-91.*
Peng, et al., "Synthesis of Titanium dioxide nanoparticles with mesoporous anatase wall and high photocatalytic activity" 2005, J. Phys. Chem. B, 109, pp. 4947-4952.*
Yu, et al., "Rapid synthesis of mesoporous TiO2 with high photocatalytic activity by ultrasound-induced agglomeration" 2002, New J. Chem. 26, pp. 416-420.*
B. Neppolian et al., *Ultrasonic-assisted pH Swing Method for the Synthesis of Highly Efficient TiO$_2$ Nano-size Photocatalysts*, Springer Science+Business Media, LLC, Catal Lett, Jul. 18, 2008, 125:183-191, 9 pages.

* cited by examiner

*Primary Examiner* — Steven Bos
(74) *Attorney, Agent, or Firm* — Christie, Parker & Hale, LLP

(57) ABSTRACT

Disclosed is a method of preparing high crystalline nanoporous titanium dioxide photocatalyst, capable of preparing the high crystalline nanoporous titanium dioxide photocatalyst in mass production through a simply synthesis method using an ultrasonification. The method includes the steps of (a) mixing a titanium precursor and a surfactant in a first solvent and performing a sol-gel reaction; (b) maturing a reactant obtained through the sol-gel reaction for 15 hours to 25 hours; (c) filtering the matured reactant and washing the matured reactant; (d) primarily drying the washed reactant at a temperature of 20° C. to 50° C. to obtain titanium sediments; (e) mixing the titanium sediments in a second solvent and performing an ultrasonification with respect to the mixed solution for 10 minutes to 120 minutes; and (f) secondarily drying the mixed solution, which has been subject to the ultrasonification, at a temperature of 15° C. to 45° C. to obtain titanium dioxide photocatalytic particles.

5 Claims, 4 Drawing Sheets

20nm

METHOD OF PREPARING HIGH CRYSTALLINE NANOPOROUS TITANIUM DIOXIDE PHOTOCATALYST

CROSS-REFERENCE TO RELATED APPLICATION

This application claims the benefit under 35 U.S.A. §119 of Korean Patent Application No. 10-2011-0124982, filed on Nov. 28, 2011 in the Korean Intellectual Property Office, the entirety of which is incorporated herein by reference.

BACKGROUND OF THE INVENTION

1. Field of the Invention

The present invention relates to a method of preparing high crystalline nanoporous titanium dioxide photocatalyst. More particularly, the present invention relates to a method of preparing high crystalline nanoporous titanium dioxide photocatalyst, capable of preparing high crystalline nanoporous titanium dioxide ($TiO_2$) in mass production through a simply synthesis method using a sonication.

2. Description of the Related Art

A photocatalyst refers to a catalyst activated by light energy. Since the photocatalyst represents the activity and reaction mechanism in the normal temperature, the photocatalyst is distinguished from the general catalyst and can be used in a simple and small-size reactor. When light having a predetermined wavelength is irradiated onto semiconductor oxide, such as $TiO_2$, electrons (e) excited by the light migrate to a conduction band and holes ($h^+$) are created and migrate to a surface of the $TiO_2$. The holes may react with $H_2O$ or $OH^-$ on the surface of the $TiO_2$, so that OH radicals are generated, and the OH radicals decompose the organic matters adhering to the surface of the $TiO_2$ by oxidizing the organic matters. The $TiO_2$ has bandgap energy of about 3.2 eV and it is generally known in the art that light having energy higher than the bandgap energy of the $TiO_2$ among solar lights has the wavelength of 380 nm or below.

The photocatalyst has been extensively used as an environmental material to remove trace organic matters and bad smells, to restrict carcinogenic substances, to treat waste water or to remove Sox and NOx, and used in the energy field to prepare hydrogen fuel by dissolving water. In addition, the photocatalyst has great potential energy in applications thereof. For instance, the photocatalyst can be used to convert harmful components into useful components as well as to decompose harmful substances.

The $TiO_2$ may not be changed even if the light is irradiated thereto, so the $TiO_2$ can be semi-permanently used. In addition, the $TiO_2$ can decompose any organic matters into $CO_2$ and $H_2O$ by oxidizing the organic matters, so the $TiO_2$ has been spotlighted as the photocatalyst.

The $TiO_2$ has three crystalline phases of rutile, anatase and brookite under the normal pressure and can be transited from the brookite and the anatase phases, which are metastable phases, to the rutile phase as the temperature is increased. The brookite and the anatase having the tetragonal structures and the brookite having the orthorhombic structure are based on the $TiO_6$ octahedral structure mainly consisting of Ti, in which the rutile shares two edges, the anatase shares four edges and the brookite shares three edges.

The rutile includes two unit cells, the anatase includes four unit cells and the brookite includes eight unit cells.

The $TiO_6$ octahedral structure serving as the basic structure is tilted from the regular octahedral structure and the tilting degree may increase in the order of the rutile, the anatase and the brookite. When determining according to the Pauling' law, the rutile is the most stable structure in terms of energy. The anatase and the brookite have the metastable structures, which can be transited into the stable structures through the high-temperature treatment. When analyzing based on the energy band concept, the anatase and the rutile have the 3.2 eV and 3.0 eV, respectively. Therefore, when comparing with the anatase, the rutile can absorb light having the wider ultraviolet band, so it is expected that the light source employing the rutile may represent the superior light efficiency than the light source employing the anatase. However, the anatase represents the superior performance in practice.

As a cited reference of the present invention, Korean Unexamined Patent Publication No. 10-2011-0011973 (publication date: Feb. 9, 2011) discloses a method of preparing TiO2 and a method of fabricating a dye-sensitized solar cell by using the same.

SUMMARY OF THE INVENTION

An object of the present invention is to provide a method of preparing high crystalline nanoporous titanium dioxide photocatalyst in mass production, capable of improving the photocatalytic effect by allowing the high crystalline nanoporous titanium dioxide photocatalyst to have the proper specific surface area and the superior crystallinity.

In order to accomplish the above object, there is provided a method of preparing high crystalline nanoporous titanium dioxide photocatalyst, which includes the steps of (a) mixing a titanium precursor and a surfactant in a first solvent and performing a sol-gel reaction; (b) maturing a reactant obtained through the sol-gel reaction for 15 hours to 25 hours; (c) filtering the matured reactant and washing the matured reactant; (d) primarily drying the washed reactant at a temperature of 20° C. to 50° C. to obtain titanium sediments; (e) mixing the titanium sediments in a second solvent and performing an ultrasonification with respect to the mixed solution for 10 minutes to 120 minutes; and (f) secondarily drying the mixed solution, which has been subject to the ultrasonification, at a temperature of 15° C. to 45° C. to obtain titanium dioxide photocatalytic particles.

According to the method of preparing high crystalline nanoporous $TiO_2$ photocatalyst of the present invention, the high crystalline nanoporous $TiO_2$ can be prepared in mass production at the room temperature through a simply synthesis method by using the surfactant, so the product yield can be significantly improved.

In addition, the high crystalline nanoporous $TiO_2$ prepared by the method according to the present invention has the superior photocatalytic characteristic as compared with P25 $TiO_2$, which has been commercially used, in terms of the self-purifying function for the organic matters.

Therefore, since high crystalline nanoporous $TiO_2$ photocatalyst prepared by the method according to the present invention has the superior photolysis effect, the high crystalline nanoporous $TiO_2$ photocatalyst is suitable for articles used in a daily life, such as air-purifying products or antibiotic-virus filters, and can be used for memory devices, logic devices, dye-sensitized solar cells, gas sensors, biosensors, and flexible devices.

In addition, since the high crystalline nanoporous $TiO_2$ photocatalyst prepared by the method according to the present invention has the superior self-purifying function for the organic matters, the high crystalline nanoporous $TiO_2$ photocatalyst can be applied in the field of green energy, such as solar cells, hydrogen energy and water purification.

DETAILED DESCRIPTION OF THE INVENTION

Figure 1:
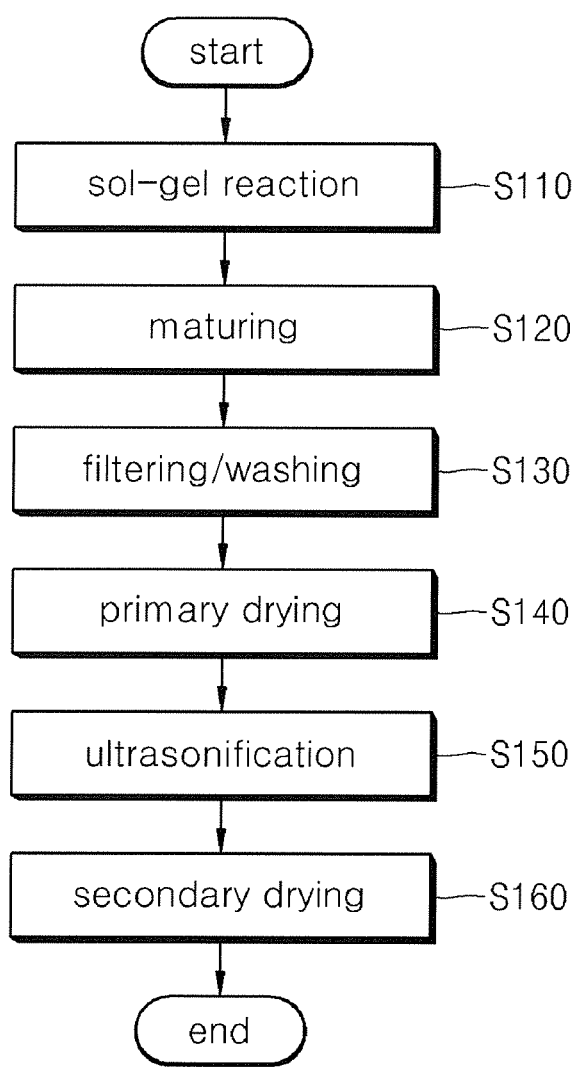
FIG. 1 is a flowchart showing a method of preparing high crystalline nanoporous TiO$_2$ photocatalyst according to one embodiment of the present invention.

Advantages and/or characteristics of the present invention, and methods to accomplish them will be apparently comprehended by those skilled in the art when making reference to embodiments in the following description and accompanying drawings. However, the present invention is not limited to the following embodiments, but various modifications may be realized. The present embodiments are provided to make the disclosure of the present invention perfect and to make those skilled in the art perfectly comprehend the scope of the present invention. The present invention is defined only within the scope of claims. The same reference numerals will be used to refer to the same elements throughout the specification.

Hereinafter, a method of preparing high crystalline nanoporous TiO$_2$ photocatalyst according to the exemplary embodiments of the present invention will be described in detail with reference to accompanying drawings.

Preparation Method of High Crystalline Nanoporous TiO$_2$ Photocatalyst

Figure 2:
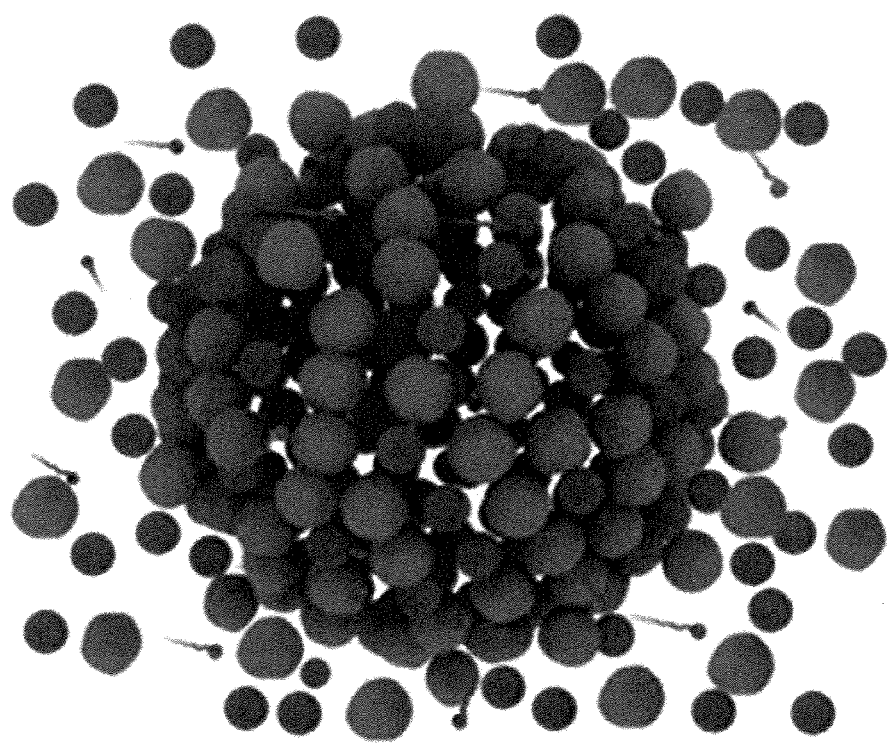
FIG. 2 is a schematic view for explaining the sol-gel reaction.

FIG. 1 is a flowchart showing a method of preparing high crystalline nanoporous TiO$_2$ photocatalyst according to one embodiment of the present invention and FIG. 2 is a schematic view for explaining the sol-gel reaction.

Referring to FIG. 1, the method of preparing the high crystalline nanoporous TiO$_2$ photocatalyst includes a sol-gel reaction step (S110), a maturing step (S120), a filtering/washing step (S130), a primary drying step (S140), an ultrasonification step (S150), and a secondary drying step (S160).

Sol-Gel Reaction

In sol-gel reaction step (S110), a Ti precursor and a surfactant are mixed in a first solvent for the sol-gel reaction. The first solvent may include water or alcohol. The sol-gel reaction may be performed at the room temperature. The room temperature may vary depending on the use environment. For instance, the room temperature is in the range of 1° C. to 40° C.

Referring to FIG. 2, according to the sol-gel reaction, metal alkoxide is transited into the sol state through the hydrolysis and condensation, and then a predetermined time has elapsed for perfect condensation so that the sol state is transited into the gel state, which cannot be networked anymore.

In detail, in sol-gel reaction step (S110), the surfactant is self-assembled in the aqueous solution, so that micelles are formed. The micelles are bonded with titanium species of TiO$_2$ while forming the cooperative assembly, so that the nanopores can be formed. As a result, titanium nanoporous structure having wormhole-like pores is formed. The titanium nanoporous structure has the amorphous framework.

Meanwhile, referring again to FIG. 1, the Ti precursor may be selected from titanium n-butoxide, titanium isopropoxide and titanium chloride.

The surfactant may be a cation surfactant.

The cation surfactant may include cetyltrimethyl ammonium bromide satisfying following chemical formula 1 or cetyltrimethyl ammonium chloride satisfying following chemical formula 2.

$$CH_3(CH_2)nN^+(CH_3)_3Br^- \qquad \text{Chemical formula 1}$$

$$CH_3(CH_2)nN^+(CH_3)_3Cl^- \qquad \text{Chemical formula 2}$$

Preferably, n is 1 to 20 in chemical formulas 1 and 2. If n exceeds 20, a length of hydrophobic tail is too long, so the surfactant may not be readily dissolved in the first solvent.

Preferably, the molar ratio of the Ti precursor and the surfactant is 3:0.01 to 3:1. If the molar ratio of the Ti precursor and the surfactant is less than 3:0.01, the amount of the surfactant is too low to form the nanopores. In contrast, if the molar ratio of the Ti precursor and the surfactant exceeds 3:1, the manufacturing cost may be increased without the additional effect of the surfactant.

The surfactant having the molarity of 0.05M to 2M is preferably used. If the molarity of the surfactant is less than 0.05M, the molarity is too low to form the nanopores. In contrast, if the molarity of the surfactant exceeds 2M, the manufacturing cost may be increased without the additional effect of the surfactant.

Maturing

In maturing step (S120), the reactant subject to the sol-gel reaction is matured for 15 hours to 25 hours. The maturing step may be performed at the room temperature. The room temperature may vary depending on the use environment. For instance, the room temperature is in the range of 1° C. to 40° C.

If the maturing time is less than 15 hours, the maturing effect is insufficient. In contrast, if the maturing time exceeds 25 hours, the crystallinity may be improved, but the productivity may be lowered due to the excessive maturing time.

Filtering/Washing

In filtering/washing step (S130), the matured reactant is filtered and washed. At this time, the matured reactant is filtered under the reduced pressure and then washed by using distilled water. Preferably, the washing may repeat at least three times.

Primary Drying

In primary drying step (S140), the washed reactant is primarily dried to obtain TiO$_2$ sediments. Preferably, the primary drying step is performed for 12 hours to 20 hours at the temperature of 20° C. to 50° C. If the primary drying temperature is less than 20° C. or the primary drying time is less than 12 hours, the crystallinity of the reactant may be degraded. In contrast, if the primary drying temperature exceeds 50° C. or the primary drying time exceeds 20 hours, the crystallinity of the reactant may be improved, but the specific surface area may be reduced.

Ultrasonification

In ultrasonification step (S150), the TiO$_2$ sediments obtained through the primary drying step (S140) are mixed with a second solvent and the ultrasonification is performed with respect to the mixed solution for 10 minutes to 120 minutes.

At this time, the ultrasonification may be performed through the scanning scheme by dipping an ultrasonic horn in the reaction bath filled with the mixed solution.

In the case of $TiO_2$ having wormhole-like pores formed through the sol-gel reaction, nanopores have the amorphous framework, so the ultrasonification is performed to improve the crystallinity for the nanopores having the amorphous framework.

If the ultrasonification is performed as disclosed in the present invention, the nanopores having the amorphous framework may be gradually changed into the nanopores having the crystalline framework. In detail, when the reactant in the reaction bath is bubble-collapsed through the ultrasonification, the reactant is subject to the extreme conditions, such as the local temperature of 5000K, the local pressure of 1000 bar, and the heating/cooling ratio of $10^{10}K/s$. For this reason, the crystallinity of the reactant may be improved and the chemical reactivity may be significantly increased on the reactant surface.

Preferably, the ultrasonification step is performed by applying the high-intensity ultrasound having the frequency of 15 KHz to 30 KHz and output power of 80 W to 120 W for 10 minutes to 120 minutes.

According to the test result, the diffraction peak of the anatase phase of the $TiO_2$ may be generated when the ultrasonification has been performed for 10 minutes and the crystallinity is continuously increased after 10 minutes has elapsed in the ultrasonification.

If the output power is less than 80 W or the process time is less than 10 minutes in the ultrasonification, the specific surface area may be remarkably increased, but the crystallinity may not be sufficiently improved. In contrast, if the output power exceeds 120 W or the process time exceeds 120 minutes in the ultrasonification, the crystallinity may be improved, but the specific surface area may not be ensured.

For instance, the specific surface area of the reactant is about 700 $m^2/g$ before the ultrasonification. This specific surface area of the reactant is reduced to about 600 $m^2/g$ if the ultrasonification is performed for 10 minutes and is reduced to about 400 $m^2/g$ if the ultrasonification is performed for 40 minutes.

Therefore, the output power and the process time of the ultrasonification must be properly set within the above range in order to obtain the high crystalline nanoporous TiO2 photocatalyst having the proper specific surface area and the superior crystallinity.

At this time, as disclosed in the present invention, if the high-intensity ultrasound is applied, the $TiO_2$ not only has the anatase phase, but also has the bicrystalline phase including anatase and brookite, and the bicrystalline phase represents the superior photolysis effect.

Secondary Drying

In secondary drying step (S160), the mixed solution subject to the ultrasonification is secondarily dried to obtain $TiO_2$ photocatalytic particles. The secondary drying may be performed by vacuum-drying the mixed solution at the room temperature. The room temperature may vary depending on the use environment. For instance, the room temperature is in the range of 15° C. to 45° C. If the secondary drying temperature is less than 15° C., the secondary drying temperature is too low, so the reactant may not be sufficiently dried. In contrast, if the secondary drying temperature exceeds 45° C., the manufacturing cost is increased and the specific surface area may be reduced due to the excessive drying.

The high crystalline nanoporous $TiO_2$ photocatalyst according to the embodiment of the present invention can be prepared through the above steps.

The high crystalline nanoporous $TiO_2$ photocatalyst prepared through the above steps (S110 to S160) has the wormhole-like pores having the mean diameter of 1 nm to 3 nm. As a result, the high crystalline nanoporous $TiO_2$ photocatalyst prepared through the method according to the present invention may represent superior organic matter photolysis effect due to the wormhole-like pores.

EMBODIMENTS

Hereinafter, the structure and operation of the present invention will be described in detail with reference to the exemplary embodiments of the present invention. The following exemplary embodiments are illustrative purpose only and the present invention is not limited thereto.

Description about known functions and structures, which can be anticipated by those skilled in the art, will be omitted.

1. Specimen Preparation

Embodiment 1

Titanium n-butoxide (97%) available from Aldrich company was used as a titanium precursor and cetyltrimethyl ammonium bromide (CTAB) available from Aldrich company was used as a surfactant.

First, the solution of the titanium n-butoxide and the CTAB was stirred for 5 minutes by using a mechanical stirrer and subject to the sol-gel reaction at the temperature of 25° C., and then matured for 20 hours at the temperature of 20° C.

After that, the matured reactant was filtered under the reduced pressure and washed three times by using the distilled water. Then, $TiO_2$ sediments were vacuum-dried for 12 hours at the temperature of 35° C.

Then, the $TiO_2$ sediments were mixed with the distilled water, and the ultrasonification was performed with respect to the mixed solution for 60 minutes under the frequency of 25 KHz and the output power of 100 W and then the mixed solution was vacuum-dried for 15 hours at the temperature of 35° C., thereby preparing nanoporous $TiO_2$ photocatalytic particles.

Embodiment 2

Nanoporous $TiO_2$ photocatalytic particles were prepared through the method similar to the method according to embodiment 1 except that the ultrasonification was performed for 10 minutes.

Embodiment 3

Nanoporous $TiO_2$ photocatalytic particles were prepared through the method similar to the method according to embodiment 1 except that the ultrasonification was performed for 90 minutes at the frequency of 30 KHz and output power of 120 W.

Embodiment 4

Nanoporous $TiO_2$ photocatalytic particles were prepared through the method similar to the method according to embodiment 1 except that the ultrasonification was performed for 120 minutes at the frequency of 30 KHz and output power of 120 W.

Comparative Example 1

Nanoporous $TiO_2$ photocatalytic particles were prepared through the method similar to the method according to embodiment 1 except that the ultrasonification was performed for 5 minutes at the frequency of 20 KHz and output power of 90 W.

Comparative Example 2

3 g of titanium nanopowder was mixed with 150 g of the 10M sodium hydroxide solution and the hydrothermal synthesis reaction was performed for 24 hours at the temperature of 120° C. In order to remove sodium cations (Na$^+$) intercalated into a titanium layer, the washing process was performed for 10 minutes by using 150 g of hydrochloric acid. Then, the titanium sediments were filtered under the reduced pressure and washed two times by using distilled water. After that, the titanium sediments were dried for 24 hours in a dry oven, thereby obtaining nanoporous $TiO_2$.

Comparative Example 3

P25 $TiO_2$, which has been extensively used as photocatalyst and available from Degussa Company, was prepared.

2. Evaluation of Physical Property

Table 1 shows the evaluation result of physical property for specimens prepared according to embodiments 1 to 4 and comparative examples 1 to 3.

TABLE 1

| Classification | Specific surface area ($m^2/g$) |
| --- | --- |
| Target value | 200 to 650 |
| Embodiment 1 | 321 |
| Embodiment 2 | 615 |
| Embodiment 3 | 272 |
| Embodiment 4 | 207 |
| Comparative example 1 | 750 |
| Comparative example 2 | 100 |
| Comparative example 3 | 50 |

Referring to Table 1, the specific surface area of the specimens prepared according to the embodiments 1 to 4 were in the range of 207 $m^2/g$ to 615 $m^2/g$, which is the proper specific surface area.

In contrast, the specimen prepared according to comparative example 1 had the specific surface area exceeding the target value, but the desired crystallinity was not obtained. In addition, the specimen prepared according to comparative example 2 had the specific surface area satisfying the target value, but there were no wormhole-like nanopores. Further, the specimen prepared according to comparative example 3 had the specific surface area of 50 $m^2/g$, which is unreasonably lower than the target value.

Figure 3:
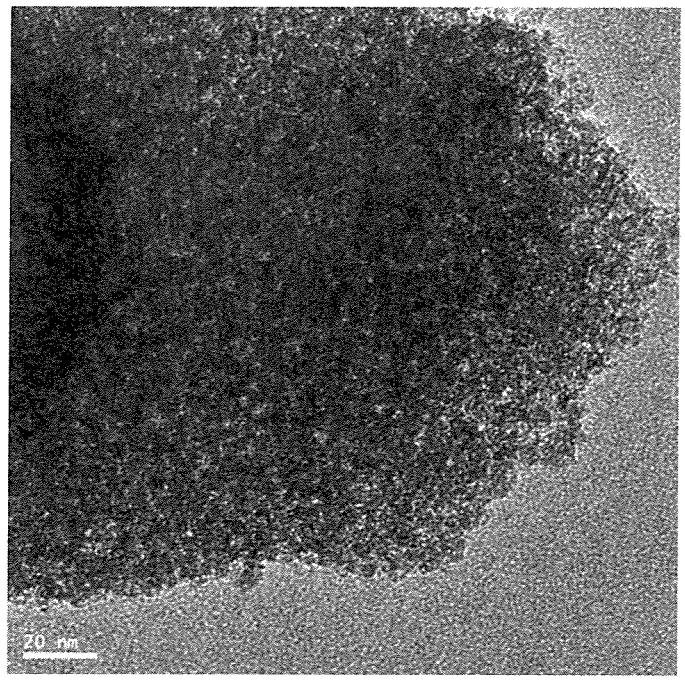
FIG. 3 is a photographic view showing a specimen prepared according to embodiment 1 of the present invention, which is photographed by a high-magnification transmission electron microscope.
Figure 3:
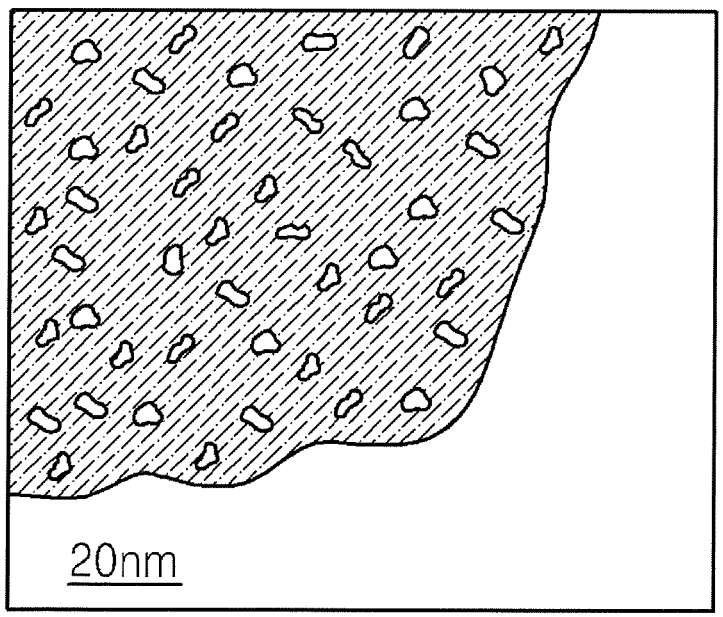

FIG. 3 is a photographic view showing the specimen prepared according to embodiment 1 of the present invention, which is photographed by a high-magnification transmission electron microscope.

Referring to FIG. 3, the specimen prepared according to embodiment 1 includes the wormhole-like nanopores having the mean diameter of about 2 nm.

Figure 4:
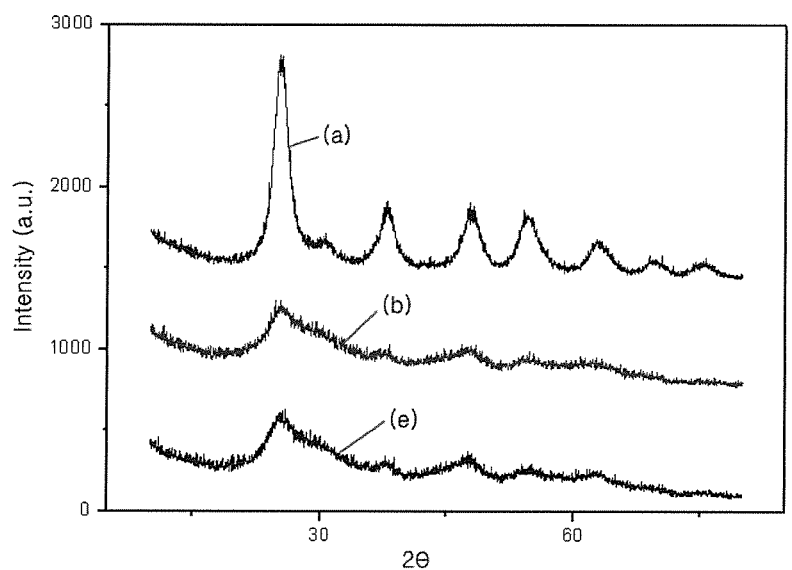
FIG. 4 is a graph showing X-ray diffraction patterns for specimens prepared according to embodiments 1 and 2 of the present invention and comparative example 1.

FIG. 4 is a graph showing X-ray diffraction patterns for specimens prepared according to embodiments 1 and 2 of the present invention and comparative example 1.

Referring to FIG. 4, the specimens a and b prepared according to embodiments 1 and 2 have the crystallinity superior to the crystallinity of the specimen e prepared according to comparative example 1. The test result represents that the crystallinity is improved proportionally to the process time of the ultrasonification.

Figure 5:
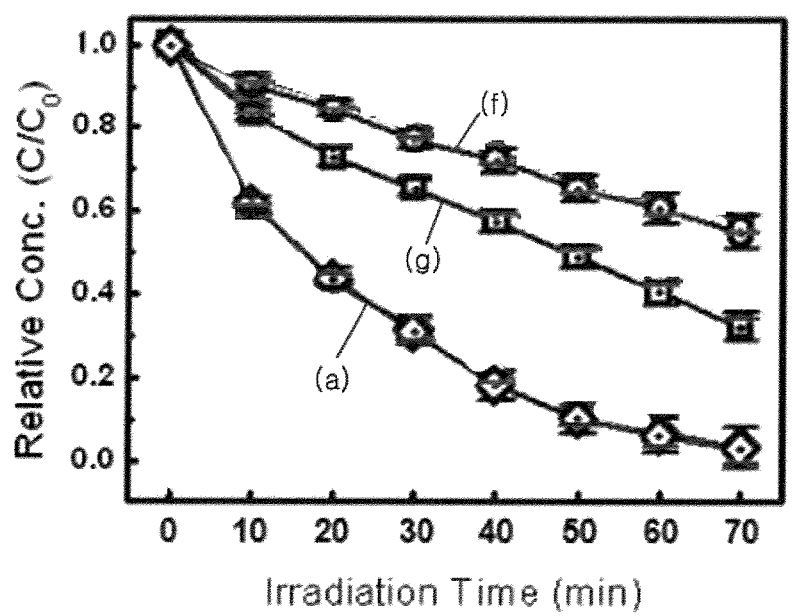
FIG. 5 is a graph showing a test result of the organic matter photolysis for specimens prepared according to embodiment 1 and comparative examples 2 and 3.

FIG. 5 is a graph showing a test result of the organic matter photolysis for specimens prepared according to embodiment 1 and comparative examples 2 and 3. The organic matter photolysis test was performed after storing the specimens prepared according to embodiment 1 and comparative examples 2 and 3 in a closed test tube for 40 hours together with reactive black 5:1 mg/L and Rohdamine B 0.1 g/L.

Referring to FIG. 5, it can be understood from the test result of the organic matter photolysis that the specimen a prepared according to embodiment 1 represented the superior purifying performance as compared with the specimens f and g prepared according to comparative examples 2 and 3. In detail, the specimen a prepared according to embodiment 1 represented the superior purifying performance as compared with the specimens f and g prepared according to comparative examples 2 and 3 because the specimen a prepared according to embodiment 1 had the proper specific surface area and superior crystallinity as compared with those of the specimens f and g prepared according to comparative examples 2 and 3.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method of preparing high crystalline nanoporous titanium dioxide photocatalyst, the method comprising:
   (a) mixing a titanium precursor and a surfactant in a first solvent and performing a sol-gel reaction;
   (b) maturing a reactant obtained through the sol-gel reaction for 15 hours to 25 hours;
   (c) filtering the matured reactant and washing the matured reactant;
   (d) drying the washed reactant at a temperature of 20° C. to 50° C. to obtain titanium sediments;
   (e) mixing the titanium sediments in a second solvent to form a mixed solution and performing an ultrasonification on the mixed solution for 10 minutes to 120 minutes; and
   (f) drying the mixed solution at a temperature of 15° C. to 45° C. to obtain titanium dioxide photocatalytic particles.

2. The method of claim 1, wherein the titanium precursor is selected from the group consisting of titanium n-butoxide, titanium isopropoxide and titanium chloride, and the surfactant is a cation surfactant including cetyltrimethyl ammonium bromide satisfying following chemical formula 1 or cetyltrimethyl ammonium chloride satisfying following chemical formula 2

$CH_3(CH_2)nN^+(CH_3)_3Br^-$   Chemical formula 1

$CH_3(CH_2)nN^+(CH_3)_3Cl^-$.   Chemical formula 2

3. The method of claim 1, wherein a molar ratio of the titanium precursor and the surfactant is in a range of 3:0.01 to 3:1.

4. The method of claim 1, wherein, in step (e), the ultrasonification is performed by applying a frequency of 10 KHz to 30 KHz and output power of 80 W to 120 W.

5. The method of claim 1, wherein, in step (f), the titanium dioxide has an anatase phase or a bicrystalline phase of anatase and brookite.

* * * * *